United States Patent [19]

Dubus

[11] Patent Number: 4,731,811
[45] Date of Patent: Mar. 15, 1988

[54] RADIOTELEPHONE SYSTEM, PARTICULARLY FOR MOTOR VEHICLES

[75] Inventor: Daniel Dubus, Mezieres sur Seine, France

[73] Assignee: Regie Nationale des Usines Renault, Boulogne-Billancourt, France

[21] Appl. No.: 783,134

[22] Filed: Oct. 2, 1985

[30] Foreign Application Priority Data

Oct. 2, 1984 [FR] France ................................ 84 15092

[51] Int. Cl.$^4$ .............................................. H04M 1/65
[52] U.S. Cl. ...................................... 379/58; 379/76; 379/88
[58] Field of Search ................. 179/2 E, 2 EA, 2 EB; 379/55, 56, 58, 63, 76, 77, 88

[56] References Cited

U.S. PATENT DOCUMENTS

| 4,122,306 | 10/1978 | Friedman et al. | 379/77 X |
|---|---|---|---|
| 4,348,550 | 9/1982 | Pirz et al. | 379/357 |
| 4,400,584 | 8/1983 | Vilmur | 379/61 |
| 4,468,813 | 8/1984 | Burke et al. | 379/58 X |
| 4,549,047 | 10/1985 | Brian et al. | 379/88 |
| 4,600,809 | 7/1986 | Tatsumi et al. | 379/96 X |
| 4,625,081 | 11/1986 | Lotito et al. | 379/88 |

FOREIGN PATENT DOCUMENTS

| 08401749 | 8/1985 | France . | |
| 0138134 | 8/1983 | Japan . | |
| 0081934 | 5/1985 | Japan | 379/58 |
| 0085655 | 5/1985 | Japan . | |
| 0119159 | 6/1985 | Japan | 379/63 |

OTHER PUBLICATIONS

IBM, "Voice-Operated Automobile Telephone Dialer", IBM Technical Disclosure Bulletin, vol. 28, No. 4, (Sep. 85), p. 1765.

Primary Examiner—Jin F. Ng
Assistant Examiner—Mark E. Han
Attorney, Agent, or Firm—Oblon, Fisher, Spivak, McClelland & Maier

[57] ABSTRACT

A radiotelephone system for motor vehicles, including a transducer for remote pickup, processing and transmitting of the speech of a user located in an environment with interference and a module for recognition of a control vocabulary by a user of the various operating modes of the system, a central processing unit connected to the speech recognition module and to a package of memories to control automatic dialing of telephone numbers of the radiotelephone in response to the recognition by the speech recognition module of the numbers or key words associated with stored telephone numbers, a module for synthesis of set speech suitable for generating, under the control of the central processing unit, permanently stored messages, a module for recording of nonpermanent voice messages from the speech transducer or from the radiotelephone and for playback of the messages by means of the radiotelephone or other voice data restoring circuits in the user environment, a selection unit for selecting predetermined modes of operation of the system, and an interface module controlled by the central processing unit to control the connections between the modules and the units of the system.

8 Claims, 11 Drawing Figures

RADIOTELEPHONE SYSTEM, PARTICULARLY FOR MOTOR VEHICLES

BACKGROUND OF THE INVENTION

1. Field of the Invention

This invention relates to radiotelephones and more particularly to a radiotelephone for motor vehicles using the techniques of speech recognition and synthesis.

2. Discussion of Background

So far, a radiotelephone installed in a motor vehicle is generally designed as a simple means of oral communication that resorts, for its use, to handling of a set provided with sending and receiving acoustic cells and a keyboard for dialing the numbers. Performance of these operations in motor vehicles causes difficulties for driving, both in regard to safety and comfort. For this reason, these operations are generally performed at low speed of the vehicle, even when it is stopped. Because of this, the difficulties encountered have resulted in a considerable limitation of the possibilities that could be offered by a radiotelephone in a motor vehicle.

Moreover, "hands-free" telephone installations are known. Generally a standard telephone set making it possible to converse over a certain distance is involved. Recently, some installations of this type have been equipped with a speech recognition and synthesis system to perform the operations of dialing a number or searching for previously stored numbers.

However, these "hands-free" telephone installations do not make it possible to solve all the problems raised, for reasons of safety and ergonomics particularly, by use of a radiotelephone in a motor vehicle. Further, these "hands-free" telephones make only slight use of the possibilities offered by speech recognition and synthesis techniques whose application to motor vehicles is described, for example, in the patent applications FR-A-82 16 066 and FR-A-84 01 749.

SUMMARY OF THE INVENTION

Accordingly, the objects of this invention are to provide a novel voice controlled radio telephone system which solves the above-noted problems and provides a "hands-free" radiotelephone system using an elaborate process of man-machine dialog with oral dialing.

These and other objects are achieved according to the invention by providing a novel voice controlled radiotelephone system, particularly for motor vehicles, having a radiotelephone itself associated with a speech recognition system, wherein the speech recognition system includes means for remote pickup, processing and transmitting of the speech of a user located in an environment with interference and a module for recognition of a control vocabulary by a user of the various operating modes of the system, a central processing unit connected to the speech recognition module and to a package of memories to control automatic dialing of telephone numbers on the radiotelephone in response to the recognition by the module of said numbers or key words associated with stored telephone numbers, a module for synthesis of set speech suitable for generating, under the control of the central processing unit, permanently recorded messages, a module for recording of non-permanent voice messages from the speech pickup means or from the radiotelephone and for reading of the messages by the radiotelephone or voice data restoring means in the user environment, means for selecting the modes of operation of the system and an interface module controlled by the central processing unit to control the connections between the modules and system means.

BRIEF DESCRIPTION OF THE DRAWINGS

A more completely appreciation of the invention and many of the attendant advantages thereof will be readily obtained as the same becomes better understood by reference to the following detailed description when considered in connection with the accompanying drawings, wherein:

FIG. 6 is a flowchart illustrating reading of the directory;

DESCRIPTION OF THE PREFERRED EMBODIMENTS

Figure 1:
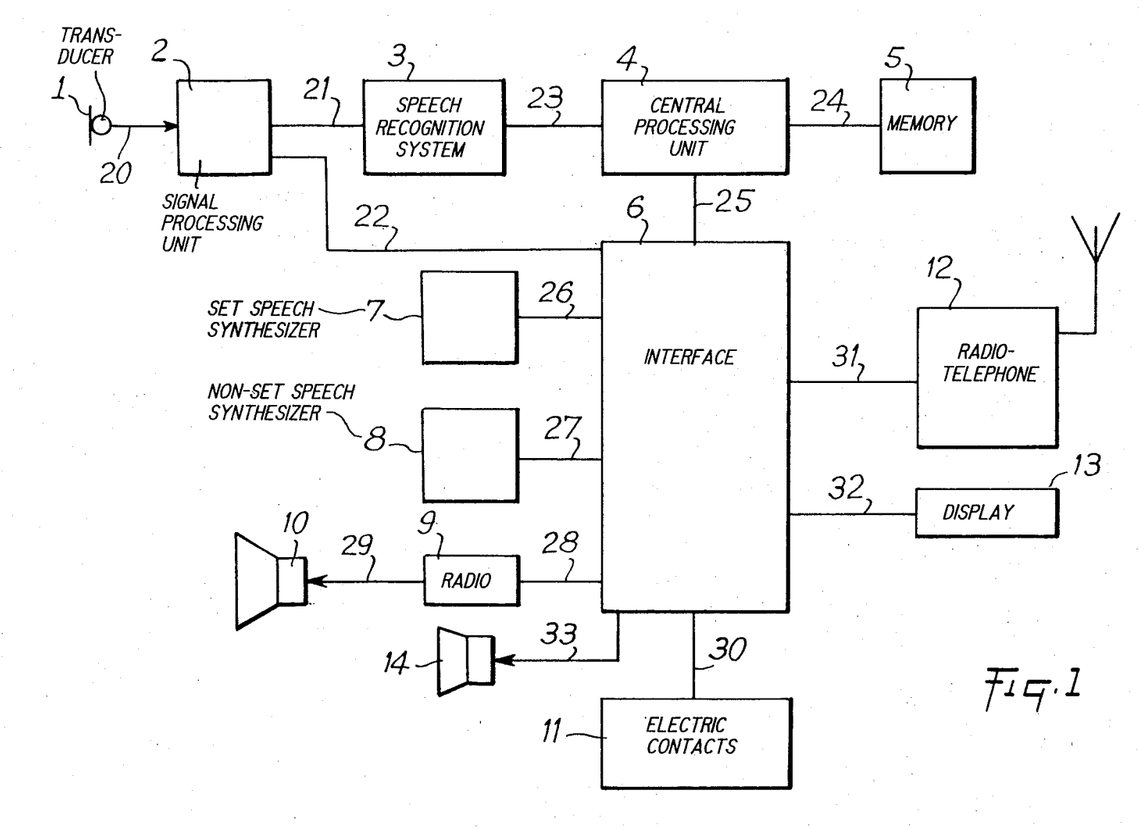
FIG. 1 is a general block diagram of the "hands-free" radiotelephone according to the invention.

Referring now to the drawings, wherein like reference numerals designate identical or corresponding parts throughout the several views, and more particularly to FIG. 1 thereof, the "hands-free" radiotelephone system comprises a conventional sound transducer system 1 such as, for example, that described in patent application FR-A-84 01 749, connected by a connection 20 to a signal processing unit 2 providing filtering and amplification functions. Unit 2 is connected by a connection 21 to a speech recognition system 3 which is controlled by a central processing unit 4 (CPU) by a connection 23. By connection 24 this central processing unit 4 controls read-only or read-write protected or unprotected memories 3. CPU 4 is connected by a connection 25 to an interface module 6 which is connected to signal processing unit 2 by a connection 22. CPU 4 runs a program and, through interface 6 and various connections 26, 27, 28, 29, 30, 31, 32 and 33, puts the various elements in communication:

a unit 7 for synthesis of set speech, a unit 8 for synthesis of speech that is not set, a unit 9 representing a car radio comprising a tuner and power amplifiers followed by speakers 10, a unit 11 representing electric contacts, a unit 13 representing a display system, and a unit 12 representing the radiotelephone itself.

By way of example, the following equipment can be used to achieve the radiotelephone system of FIG. 1:

a sound pickup system 1 as described in patent application FR-A-84 01 749, a system RMI 88, of the VECSYS company, for speech recognition of isolated words, for system 3, the system ISBC 80/24 of the INTEL company for CPU 4, the system PSM 6463 of the PLESSEY company for the protected memory part of unit 5, whose complement is included on card ISBC 80/24, a speech synthesizer circuit 5220 A of the TEXAS INSTRUMENT company for unit 7, a circuit HC 55564 of the semiconductors MATRA-HARRIS company, which uses delta modulation and demodulation techniques for unit 8. For filtering around this circuit, it is possible to take a standard technique of analog filters, or the circuit HC 5512C of the same company. The modulator/demodulator circuit has a clock input making it possible very easily to perform the synthesis between 9 Kbits/s and 64 Kbits/s and therefore to choose the desired compromise between the quality of the synthesis and memory space used.

a car radio such as that of the PHILIPPS company equipping the vehicles RII Electronique de la Regie Nationale des Usines Renault for units 9 and 10, a miniature earphone adaptable to the driver's ear for confidential speaker, a radiotelephone 450 MHZ of the THOMSON company for unit 12, a display HDSP-8716 of the HEWLETT-PACKARD company for unit 13, a standard group of relays, filters and amplifiers for unit 6, various types of connections: series, parallel, multibus, analog for connections 20, 21, 22, 23, 24, 25, 26, 27, 28, 29, 30, 31, 32 and 33;

various contacts for unit 11, namely:
 a two-position, normal or standby switch-on contact,
 an automatic/manual mode selection contact,
 a fleeting contact to perform an interruption on the software to stop either a mode or a telephone communication,
 a fleeting contact to record messages on the scratchpad, and
 a selection contact for general listening or confidential listening.

All the equipment cited above can be replaced by others offering equivalent services. This first description shows that the invention minimizes visual or manual interventions of the driver.

Figure 2:
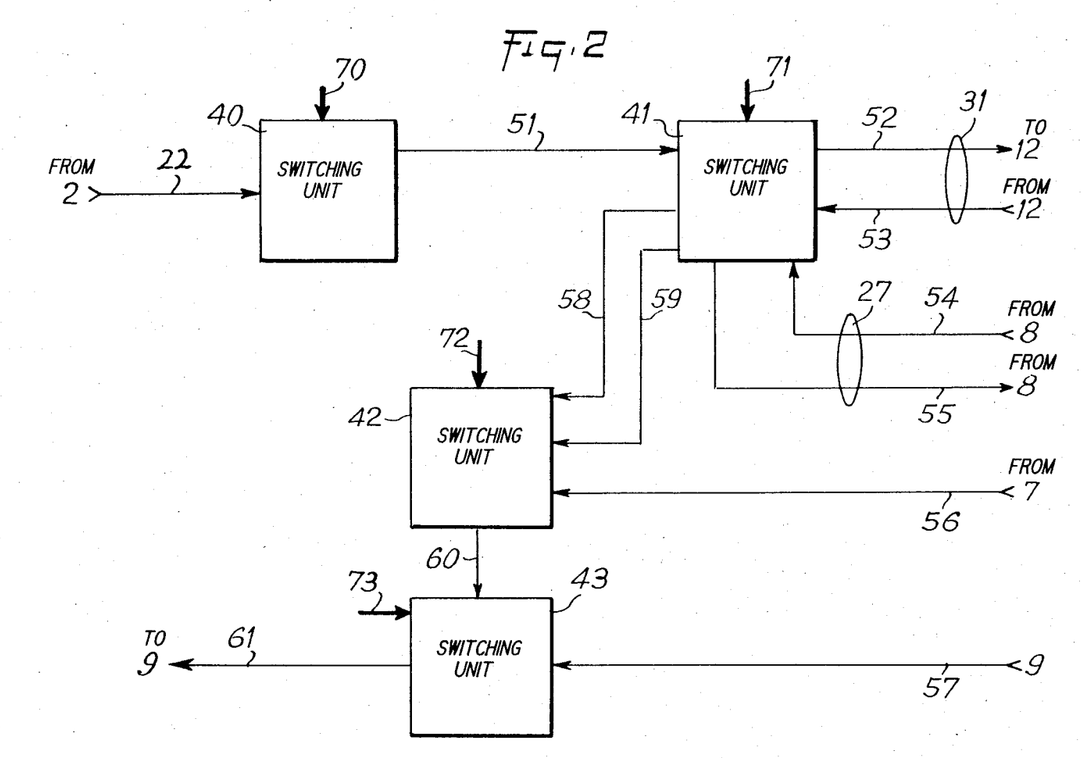
FIG. 2 is a block diagram of a module for switching of speech signals and low-frequency signals.

FIG. 2 shows main units 40, 41, 42 and 43 consisting of relays, filters and amplifiers, of the interface 6. These units, which are part of interface 6 of FIG. 1 are controlled by control and checking signals 70, 71, 72 and 73 which correspond to connection 25 and come from CPU 4 of FIG. 1.

The signal carried by connection 22, corresponding to connection 22 of FIG. 1, is an analog speech signal representing the driver's voice. After going into unit 40 as shown in FIG. 2, this speech signal is applied to unit 41 by connection 51. This signal is switched by unit 41 either to radiotelephone 12 by connection 52 or to delta modulator 8 by connection 55. The first case corresponds to that of a telephone communication, the second to that of use to create key words of the directory or message for the scratchpad.

The signal carried by connection 53 coming from radiotelephone 12 can represent either speech or digital data. This signal is switched by unit 41 either to the amplifier of car radio 9 by connection 58 or to delta modulator 8 by connection 55. The first case corresponds to a telephone communication, the second to the creation of messages for work station application when the radiotelephone is in standby position. This aspect of the system will be described more in detail in regard to FIG. 11.

The signal carried by connection 54 and coming from delta demodulator 8 is switched, by unit 41, either to radiotelephone 12 by connection 52 or to the amplifier of car radio 9 by connection 59. The first case corresponds to the work station application, the second to listening to key words of the directory or of messages of the scratchpad.

The signal carried by connection 56 and coming from synthesis circuit 7 is or is not sent to the amplifier of car radio 9 by means of switching unit 43. The set messages that it represents correspond either to questions or to responses according to the man-machine vocal dialog going on between the driver and the radiotelephone system.

Connection 60 carries one of the signals possibly present on connections 58, 59, 56, by unit 42. The signal carried by connection 57 comes from the tuner of car radio 9 and is sent, depending on whether or not a signal is present on connection 60, by unit 43, to the amplifier of car radio 9 by connection 61.

The signal present on connection 61 can therefore represent either a radiotelephone signal coming from connection 53, or from the non-set synthesis called delta coming from connection 54 or from LPC set synthesis coming from connection 56 or a signal of the tuner of the car radio coming from connection 57. Without the presence of one of these signals, connection 61 cannot carry any signal.

As a variant, car radio 9 can be separated from the noted three sources and standard means can be provided to act simply on the sound level of the car radio, the signal carried by connection 60 then being injected directly in a separate power amplifier-speaker(s) unit.

Each of switching units 40, 41, 42 and 43 has its amplification and filtering system because each signal source (radiotelephone, speech synthesis, microphone, tuner) has its own level and spectral dimension.

Figure 3:
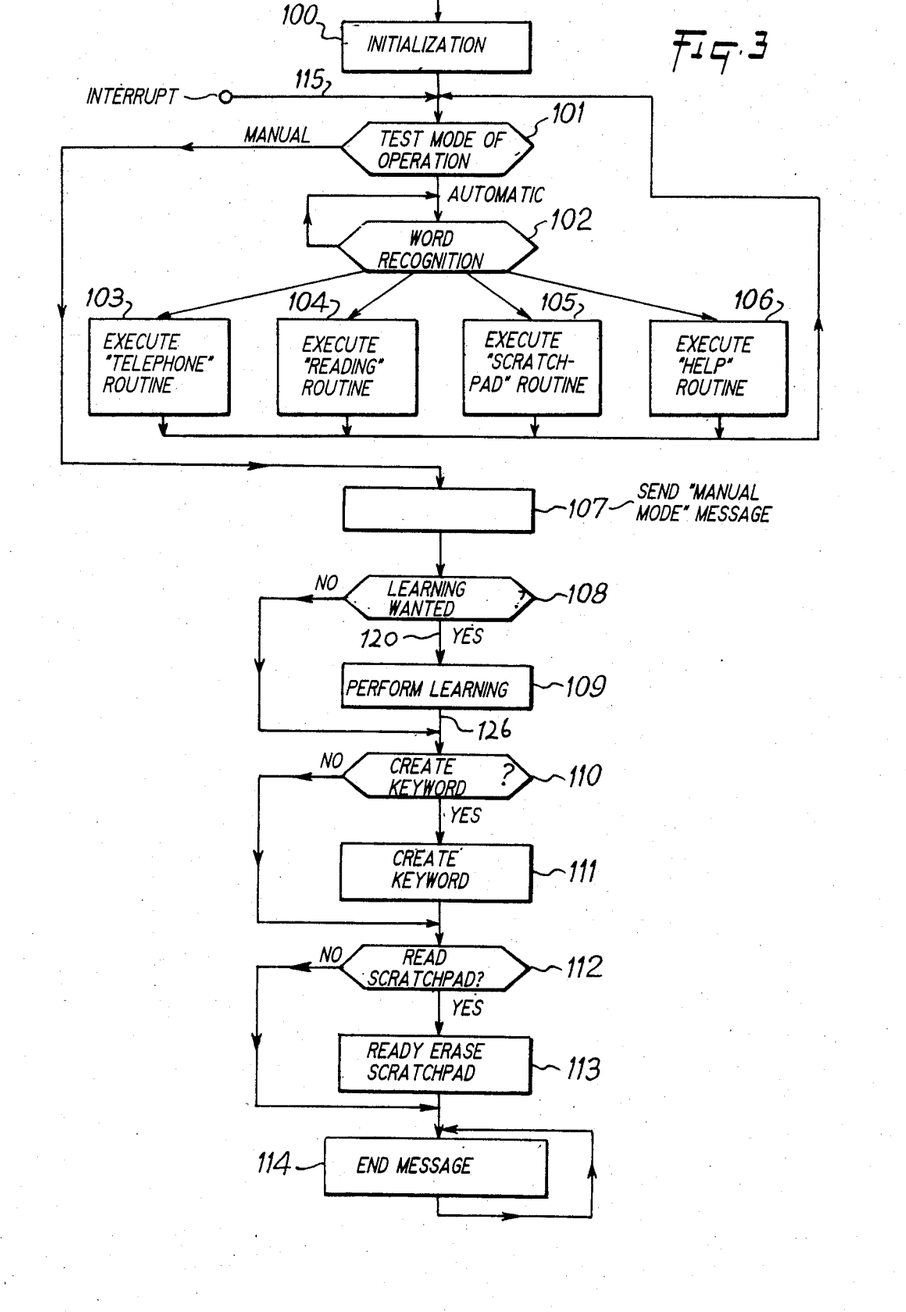
FIG. 3 is a main operation flowchart of the "hands-free" radiotelephone system.

FIG. 3 represents the main operating flowchart of the radiotelephone system in normal use and is made up of two distinct parts: the manual phase and the automatic phase, this latter corresponding to normal use of the system.

Step 100 represents initialization of the system, i.e., the various initializations of the main units described in FIG. 1 and inputs-outputs.

Stage 101 is a test on the mode of operation, manual or automatic, selected. In case of an automatic mode, test 102 is entered which loops on itself while waiting for recognition of a word that can be TELEPHONE, READING, SCRATCHPAD or HELP. These words are given by way of example, but the driver can choose any other acoustic form as allowed by the speech recognition system. Non-recognition of the word pronounced causes looping to unit 102.

Figure 7:
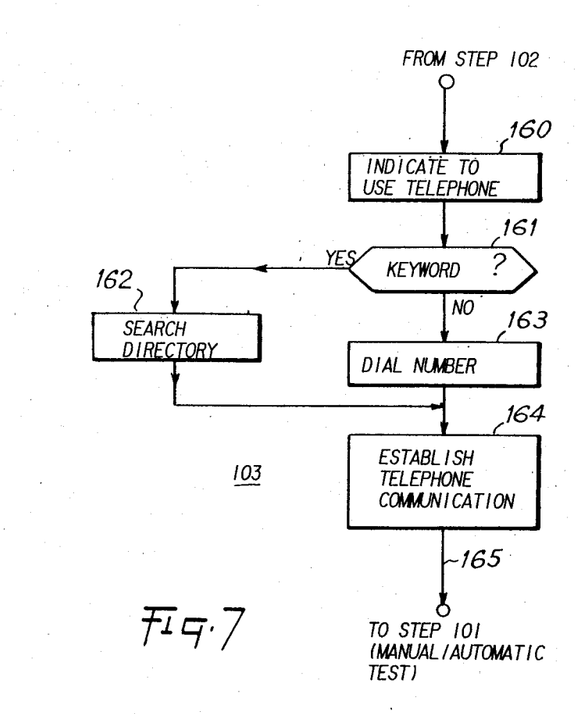
FIG. 7 is a flowchart illustrating the various cases encountered in dialing a telephone number to obtain a telephone communication.
Figure 9:
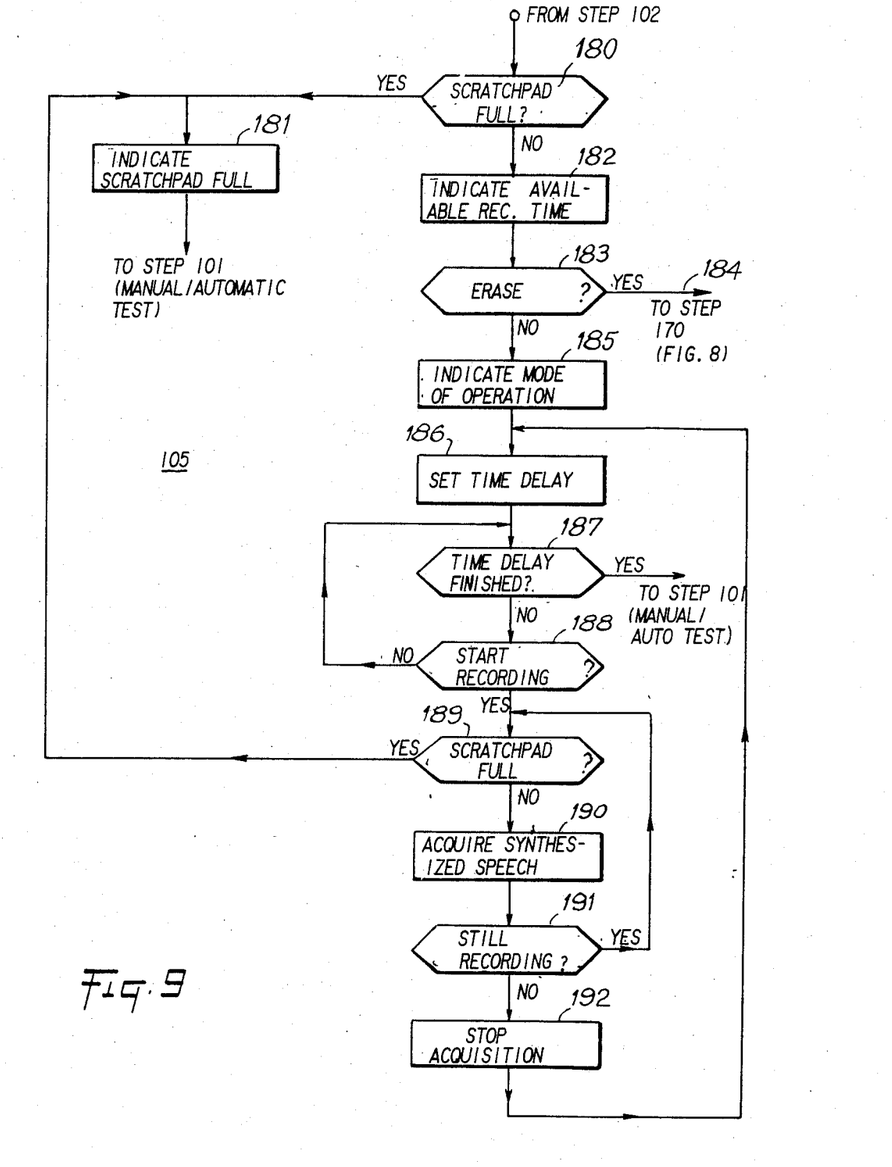
FIG. 9 is a flowchart illustrating the creation of messages in the "scratchpad"
Figure 10:
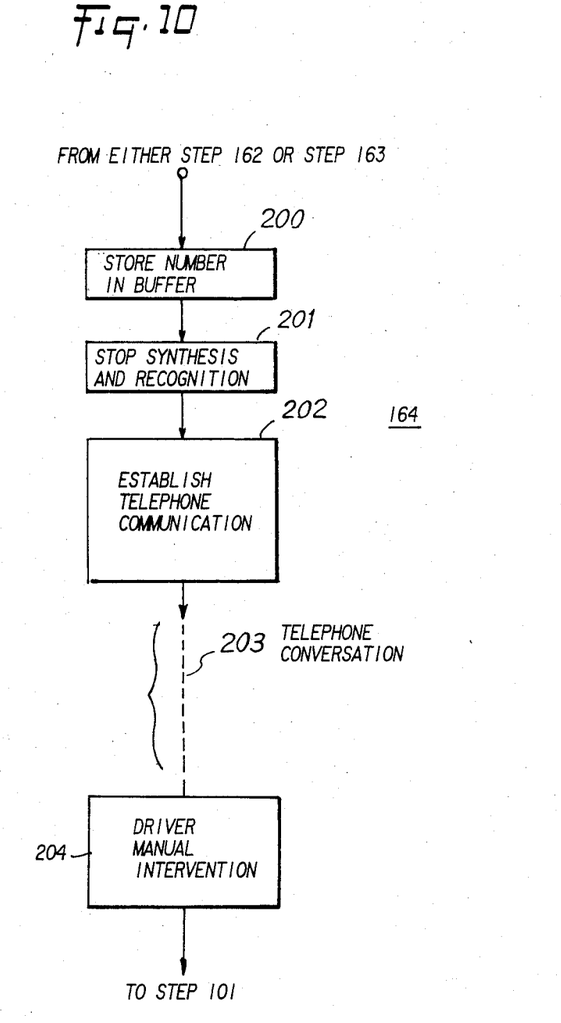
FIG. 10 is a flowchart illustrating establishing of a telephone communication.

If the word TELEPHONE has been pronounced, a TELEPHONE routine 103 is executed which is described more in detail in FIGS. 7 and 10. If the word READING is pronounced, a READING routine 104 is executed which is described more in detail in FIG. 6. If the word SCRATCHPAD is pronounced, a SCRATCHPAD routine 105 is executed which is described more in detail in FIG. 9. If the word HELP is pronounced, a HELP routine 106 is executed, which consists in outputting as set synthesis all the messages and the way to use the radiotelephone system. All these modes then loop to step 101. Interruption 115 can be triggered at any time by switching the manual-/automatic button. This interruption 115 can also be triggered at any time by a fleeting contact to abandon a mode in progress, among others, to stop a telephone communication. This latter solution is more flexible than that of a voice command but this variant is entirely possible.

If step 101 identifies a manual mode, step 107 is executed which corresponds to sending a message in set speech synthesis indicating being in the manual mode. This step can also correspond to sending a visual message to display device 13.

Then step 108 is entered where the question is asked "Do you want learning?" by set synthesis (unit 7) and, by unit 3 for speech recognition, the positive or negative response of the driver is tested. In case learning has never been done or has been erased, recognition cannot be done on the words YES or NO (cited by way of example) and learning is set, represented by step 109 and described more in detail in FIG. 4. Otherwise step 110 is entered where the question is asked, by set synthesis, about the creation of a key word in the directory. If the response is positive, step 111 is executed which is described more in detail in FIG. 5. Otherwise step 112 is entered where the question is asked about the reading of messages of the scratchpad. If the response is positive, step 113 is performed which is described more in detail in FIG. 8. Otherwise an end is made on a message by set speech synthesis inviting the user to leave the manual mode and represented by step 114. This operation will be done by switching the mode selection button from manual position to automatic position.

Figure 4:
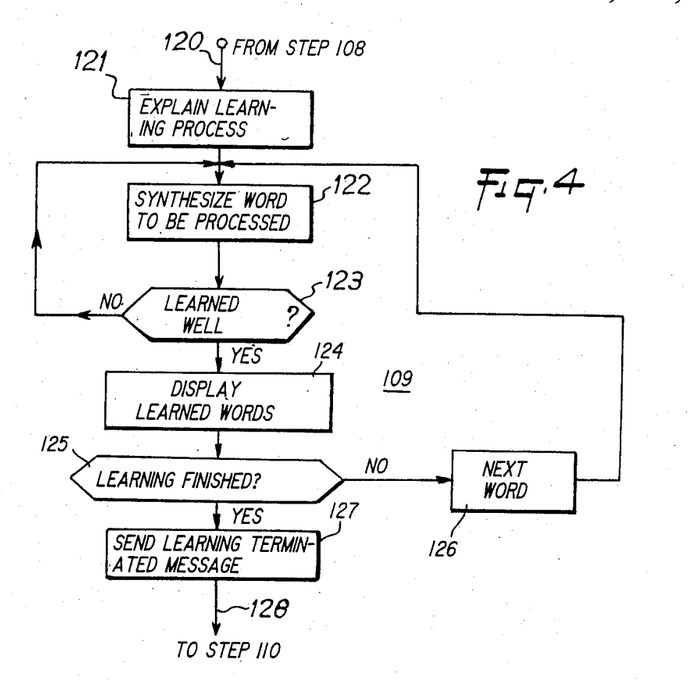
FIG. 4 is a flowchart illustrating the "vocabulary learning" mode for a minimal operation.

FIG. 4 illustrates the learning procedure (step 109 of FIG. 3). By 120, step 121 is reached which is a group of voice messages generated by set synthesis explaining the procedure. Then step 122 corresponds to sending, in set synthesis, of the word that should be learned. Step 123 represents learning of the word and the test determining if the word was pronounced well by the speaker. In case of poor learning, a return is made to step 122.

In case of correct learning, the learned word is displayed in step 124 and then step 125 is performed to determine if learning is finished. If not, step 126 is performed and the next word is taken up in step 122. If learning is finished, then step 127 is entered which corresponds to sending of a set voice synthesis message announcing that the learning phase is terminated and 128 leads to unit 110 of FIG. 3. The vocabulary thus learned corresponds to minimal operation of the radiotelephone system.

A possible variant is to avoid this learning phase by using a multispeaker speech recognition system for unit 3. However, this solution has the drawback of depriving the driver of the freedom to choose the acoustic forms that he desires and does not make it possible to create an associated vocabulary for each different language, which takes away its universal character from the system. On the other hand, a stored part of the set synthesis (unit 7) is then eliminated.

Figure 5:
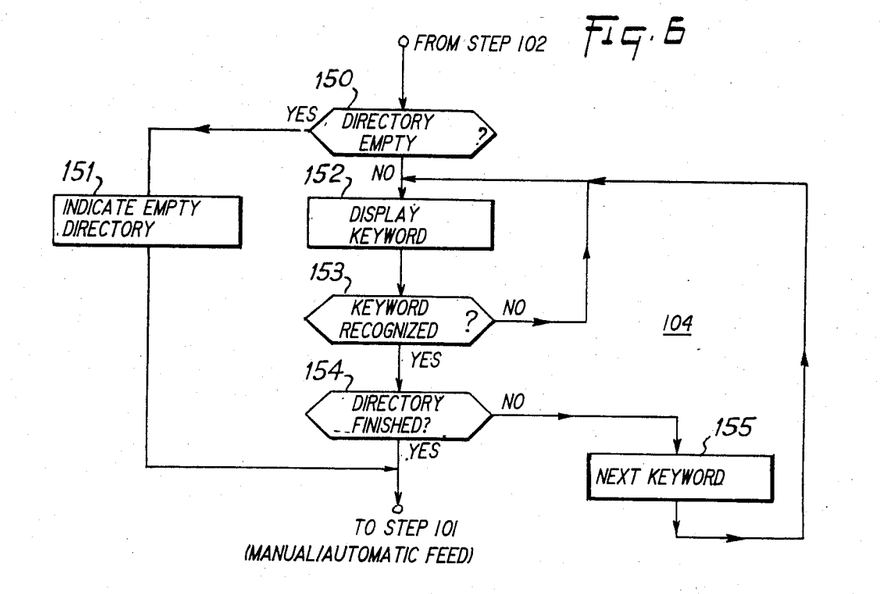
FIG. 5 is a flowchart illustrating the operation of a directory.

FIG. 5 describes the operation of the directory at the level of the creation or erasing of a key word. A key word is defined as an acoustic form with which a telephone number is associated. Thus, each time a key word will be recognized by the system, the associated telephone number will be dialed automatically, which avoids picking out the number digit by digit. However, when a list of key words is too long, the user runs the risk, after a certain time, of forgetting part of it. To offset this drawback, it can be conceived to note in writing, in going along, the creations or modifications of this directory. The unwieldiness of a solution of this type can quickly be perceived, and one of the purposes of the invention is to solve this problem by making it possible, in going along, to record these key words and restore them in vocal form to the driver.

A first solution would consist in using a standard tape recorder, but the erasing and recording problems would very quickly become very clumsy to manage.

Another solution would consist in using the same algorithm for speech recognition and synthesis, but circuits now available do not make it possible to perform synthesis in real time in a simple way. Further, it should not be forgotten that the driver freely chooses the key words that he wants and cannot be asked to compose on an alphabetic keyboard the orthography of these key words to have a visual check. For the radiotelephone to be "hands-free", this check can only be done orally.

In regard to the technical characteristics of the delta modulator/demodulator circuit (unit 8), use of this type of synthesis is very easy to achieve and in a very flexible way allows the choice of the desired voice restoring quality.

Step 130 is a test where the speaker is asked, by a message sent in set synthesis (unit 7), if he wishes to add a key word to the directory. In the affirmative, step 131 is entered where it is determined if the directory is full. If this latter possibility is realized, the driver is warned about it both by the set synthesis and display (step 132), then the sequence in the main flowchart (FIG. 3) is continued. If the directory is not full, step 133, by a message in set synthesis, invites the driver to pronounce the key word. Step 134 initiates both learning and delta modulator 8 and tests to see whether the learning was correct. In the case of poor learning, there is looping to step 133. Otherwise the driver is invited, at step 135, to list the digits that make up the associated telephone number. Step 136 represents this phase of learning of the digits during which the system is in recognition phase and an echo by set synthesis of the pronounced digit is resent to the driver to serve for verification. Further, a visual check can be performed by display of the digit on display device 13.

With this learning operation finished, step 137 is entered where a test is made to see if the driver wants to create another key word. In the negative, the sequence in the main flowchart is continued (FIG. 3). Otherwise, looping to step 131 is performed.

In case of negative response to step 130, step 138 is entered to test to see if the directory is empty. A positive response leads to step 143 where the user is offered the possibility of adding key words. Otherwise the first key word is output in delta synthesis, at step 139, the driver is asked, at step 140, if he wishes to erase it. If the response is positive, step 141 assures updating in the directory and the speech recognition system. Then step 142 makes it possible to scan all the key words of the directory successively, after which step 143 is entered. If the response at step 140 is negative, step 142 is entered directly.

Analysis of the flowchart of FIG. 5 shows that the operations described are done without manual intervention. The only one that can occur at any time is the interruption made by the driver who decides to abandon this mode which is in progress. At any time, visual data appearing on display system 13 can complete the set synthesis voice messages sent by unit 7.

FIG. 6 describes the procedure of reading the directory, represented by step 104 of FIG. 3. Step 150 makes it possible to determine whether the directory is empty and, in the affirmative, step 151 is entered where a corresponding set synthesis message is sent, after which the main program is followed in sequence (FIG. 3). Otherwise, the first key word is sent by delta synthesis, then the associated telephone number is displayed (step 152). Step 153 makes it possible to go back to step 152 by speech recognition. If there is not a return, step 154 is entered where an examination is made to see if the end of the directory has been reached. In the negative, step 155 is entered where a search is made for the next key word, then there is a return to step 152 where this new key word is spoken in delta synthesis.

A variation of step 152 would be to send, in set synthesis, the associated telephone number, together with or as a replacement of its display on device 13.

FIG. 7 describes the procedure that is executed when the word TELEPHONE has been recognized and corresponds to step 103 of FIG. 3. At step 160, the system sends, by set synthesis unit 7, a message to invite the driver to dial the telephone number. The driver has the choice of pronouncing either a digit or a key word (step 161). If a key word has been recognized, step 162 is entered where the directory is used to search for the corresponding number. Otherwise, as soon as the first digit is pronounced, step 163 is entered where the driver picks out the digits one by one, this step comprising tests (not shown) depending on the various cases of number length that are encountered, of nonrecognition and correction in the case of an error. The next step 164 corresponds to operation, after obtaining of the telephone number, and is described more in detail in FIG. 10. Then, when step 164 is completed, step 165 is entered which corresponds to the return to manual/automatic test 101.

Figure 8:
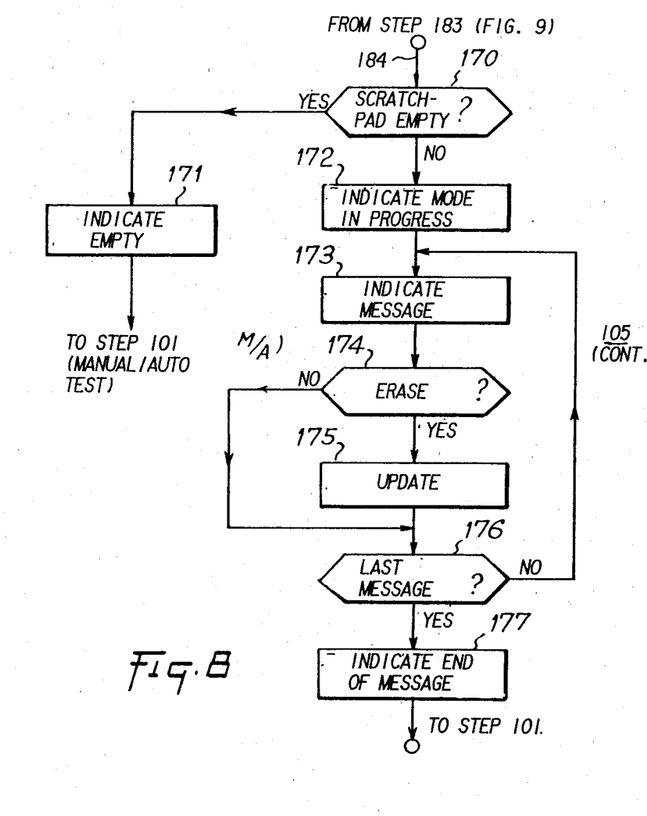
FIG. 8 is a flowchart illustrating reading or erasing of messages in the "scratchpad" or messaging operating mode.

FIG. 8 illustrates the procedure of reading and erasing of scratchpad messages. These messages, for the same reasons as those given in regard to key words, are realized by resorting to delta modulation/demodulation unit 8.

Step 170 has the object of determining whether the scratchpad is empty and, in the affirmative, step 171 is entered where the corresponding message is sent by means of set synthesis and/or a visual display, and then there is a return to manual/automatic test (step 101, FIG. 3).

In case the scratchpad is not empty, indications on the operation of the mode in progress are sent by set synthesis unit 7 to step 172. The difference between a key word and a message is that the former is always recorded on a fixed time. The stored first message is sent by delta synthesis unit 8 to step 173 and the following step 174 verifies, by speech recognition whether the driver wishes to erase it. In the affirmative, update step 175 consists in updating the appropriate memory zones. Step 176 verifies whether the last message has been reached. In the affirmative, a message in set synthesis is sent to step 177 indicating this fact, optionally with display, and the sequence is continued. Otherwise, looping is made to the next message by going to step 173.

FIG. 9 describes step 105 of FIG. 3 which consists in creating messages in the scratchpad. A test is made, by step 180, to see if the scratchpad is full, i.e., if there is enough memory space to make the recordings. If such is not the case, step 181 is executed where the corresponding indication is sent by set synthesis and/or display, then the manual/automatic test is continued in sequence. In general, in this case, the driver will go into manual mode to eliminate messages that he considers useless if he wishes to add others.

If the scratchpad is not full, step 182 is entered where the available recording time is indicated to the driver which is imparted to him by set synthesis and/or a horizontal bar graph display whose length is proportional to the available recording time. At step 183, a test is made to see if the driver wishes to erase messages and, in the affirmative, a return is made to step 170 by branching 184 of FIG. 8. Otherwise, step 185 is executed which consists in sending, by set synthesis and/or display, indications on the operation of the mode.

The next step 186 makes it possible to set a time lag and step 187 assures a return to the manual/automatic test in case the time lag is finished and no action has been taken. Otherwise step 188 is entered where a test is made to see if the driver has pressed the fleeting recording start button. In the negative, a looping is performed to test 187, during the period of the time lag. In the affirmative, as soon as the fleeting contact is pressed, step 189 is entered where a test is made on the content of the memory available for recording. If this test indicates that there is very little memory, step 181 is entered.

In the opposite case, at step 190 acquisition is performed of the binary output sent by delta modulator unit 8 at the rate of the clock frequency that has been imposed (the driver, to the detriment of memory space, can increase the frequency range to improve the speech quality which will be restored or vice versa). Between two acquisitions of the binary output of delta modulator unit 8, step 191 is executed to monitor whether pressure is still maintained on the fleeting contact. In the affirmative, a return is made to step 189. Otherwise, it is considered that the driver has finished his message and step 192 is entered to stop acquisition in delta synthesis and to archive the memory spaces. There is then a return to step 186 with visual indication of the remaining recording time.

FIG. 10 describes the procedure for establishing a telephone communication and explains step 164 of FIG. 7 more in detail. Once the desired telephone number has been obtained (either by pronouncing the key word or by picking it out digit by digit), step 200 represents validation of this number in a control buffer memory. Then, step 201 assures the inhibition of speech recognition and synthesis and the desired switching of interface 6 of FIG. 1.

Then, the number is sent to radiotelephone keyboard 12, while observing its control process. A first solution consists in using relays in parallel with the various keys of the keyboard. Another possible solution is to operate the series connection existing on this type of radiotelephone. Once a number has been sent, this type of radiotelephone undertakes to test its connection to the public network and dialing of the number. Interface 6 of FIG.

1 comprises filters of the PLL (phase-locked loop) type making it possible to test either a call bell or a line and system tie-up. Interface 6 connects the telephone connection by "removing" the receiver, according to the explanations given in regard to FIG. 2. All these operations are represented by step 202. The length of the telephone conversation is represented by 203. Manual intervention 204 of the driver stops the telephone communication by making an interruption and a return to the manual/automatic test. As a variation, stopping of the communication could be realized by means of speech recognition.

Figure 11:
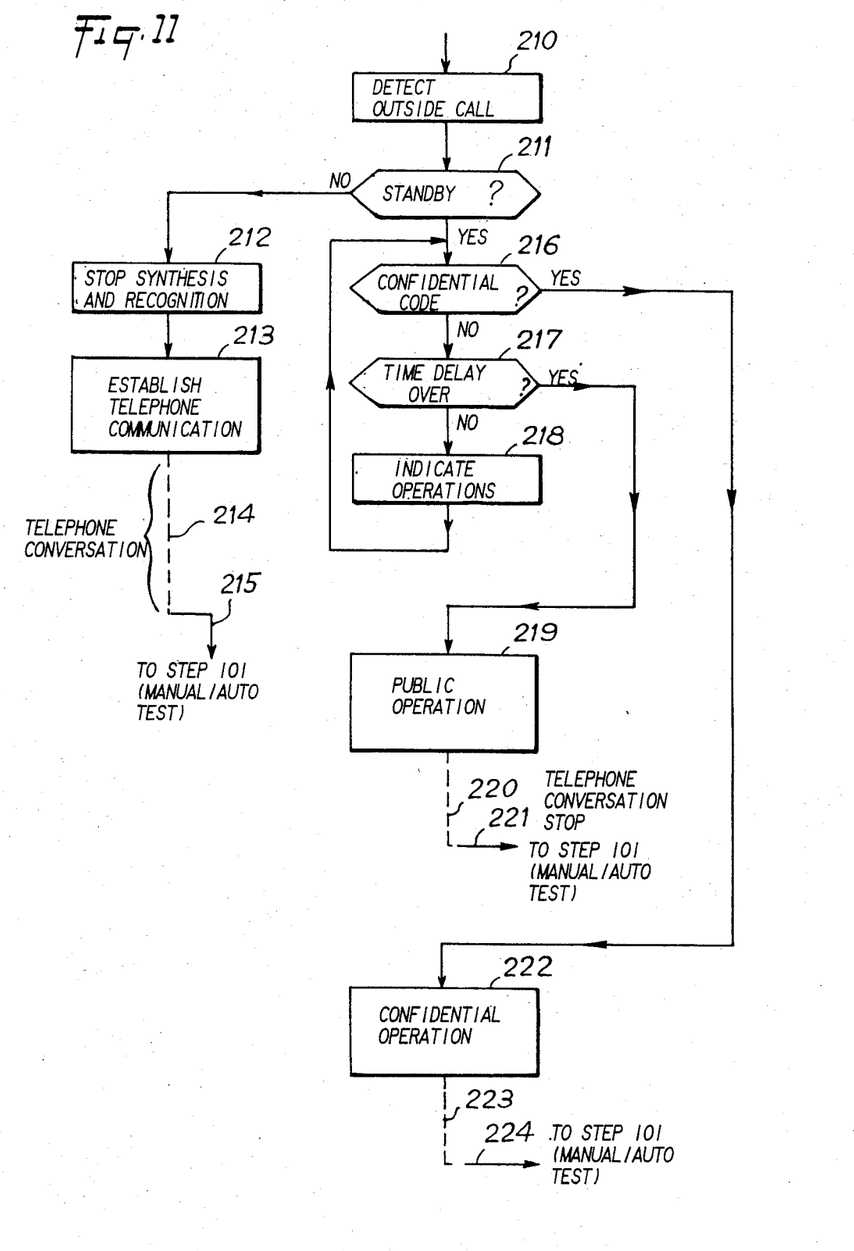
FIG. 11 is a flowchart illustrating the operation of the radiotelephone in the normal mode or in the work station mode in the presence of an outside call.

FIG. 11 explains the use of the "hands-free" radiotelephone in normal mode or in work station mode for an outside call. As explained before, the presence of the directory and scratchpad combined with delta synthesis already introduces a work station approach. Of course, it is always possible to connect other very different elements to complete this operation.

Step 210 represents an outside call which is detected on the filter base and the PLL (phase-locked loop) circuit and which triggers an interruption. This step 210 also represents the switching of the various elements of interface 6 of FIG. 1 to assure the telephone connection. Then, at step 211, the stop/normal/standby contact position is tested. If the position is normal, step 212 is entered where speech recognition and synthesis is inhibited and the telephone connection is established, a phase represented by step 213. Of course, this connection is made only if the driver is not already in a telephone conversation. Certain arrangements are made (not shown) at the software level so that this interruption will not cut off certain operations such as, for example, the creation of a scratchpad message or a key word in the directory. Various embodiments can be provided at this stage. Telephone conversation 214 is stopped by the driver by causing an interruption 215 and then there is a return to the manual/automatic test.

If a standby position is detected at step 211, the radiotelephone will be used in an "answerer" function, either with confidential access or public access. At step 216 a test is made to see if the system is operating in a confidential mode. In the affirmative, step 222 is entered, where several confidential code variations can be envisaged, for example, sending of a series of frequencies or use of speech recognition, the first being easier to use. In case of detection of the confidential code, the confidential operation is performed consisting, for example, in allowing the hearing of certain scratchpad messages or recording on this scratchpad of messages by the bias of delta synthesis unit 8. Of course, access to certain messages can be partitioned.

These operations are done without disturbing the driver: actually with reference to FIG. 2, it can be seen that connections 52–54 and 53–55 can be established without disturbing 57–61, for example.

Telephone communication 223 will be stopped at 224, when it is detected that the partner connected with the radiotelephone has hung up, on the basis of a detection of tone or bell. Then there is a return to manual-/automatic test 101.

If step 216 gives a negative result, step 217 is entered which tests a previously set delay time. During this delay time, step 218 is executed which represents a group of operation indications supplied to the partner by set synthesis unit 7. When the time delay is over, step 219 is entered which represents public use of the system. Here several variations are possible which are standardly known on answerers. It is possible, for example, to use a tape recorder for recording messages which is controlled by the system to save storage space. The driver can then use these recordings later by creating, for example, on his scratchpad in delta synthesis messages which correspond to brief resumes of messages received and recorded on the tape recorder. It is also possible to record messages directly from the partner in the scratchpad by non-set synthesis unit 8 if storage space allows it. Telephone conversation 220 is stopped at 221 in the same way as at 224 and there is a return to the manual/automatic test.

The radiotelephone system according to the invention does not require use of a standard telephone set and therefore frees the user's hands almost completely. His only manual interventions are those described above to actuate the various contacts provided.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A speech recognition system for an automatic voice controlled radiotelephone system having a radiotelephone, comprising:

transducer means for remote pickup, processing and transmitting of speech of a user;

recognizing means for recognizing a user control vocabulary including numbers and key words associated with stored telephone numbers, said control vocabulary stored in a directory and derived from speech of a user of the speech recognition system;

a central processing unit connected to said recognizing means and including plural memories for controlling automatic dialing of telephone numbers on the radiotelephone in response to a recognition by said recognizing means of numbers and key words stored in said directory;

synthesis means for synthesizing of set speech signals suitable for generating, under the control of the central processing unit, permanently stored messages;

recording means including a scratchpad for recording of non-permanent voice messages from the transducer means or from the radiotelephone and for playback of the recorded messages;

selecting means for selecting predetermined modes of operation of said speech recognition system; and interface means controlled by said central processing unit for controlling connections between said central processing unit, said means for synthesis, said transducer means, said recording means, and said recognizing means;

wherein said predetermined modes selected by said selecting means comprise;

a normal operation mode in which said recognizing means and said synthesis means are inhibited and a telephone communication between the user and another party is established upon said user receiving a call from said another party, and a standby operation mode in which upon receiving a call from said another party, said another party can retrieve non-permanent voice messages stored in said scratchpad; and means for detecting a confidential code sent by said another party to enable addressing of said scratchpad and retrieving by said another party of said non-permanent voice messages stored in said scratchpad only upon detection of said confidential code.

2. A system according to claim 1, wherein the modes selectable by said selecting means comprise:

a manual mode for learning of said control vocabulary by said recognizing means and for modifying said key words stored in said directory and updating the non-permanent messages stored in said scratchpad of said recording means, and an automatic mode for controlling, by means of said control vocabulary, automatic establishing of a telephone communication by said central processing unit, the automatic reading of said scratchpad and recording of messages in the scratchpad, and sending of help instructions in voice form by means of said synthesis means to facilitate using of said system.

3. A system according to claim 2, wherein said selecting means comprises:

a manual control contact for recording, by the user, of scratchpad messages in said recording means; and a manual control contact for interruption of telephone communication.

4. A system according to claim 1, comprising:

a speaker for private listening; wherein the modes selectable by said selecting means include, a mode for selection of public listening or private listening by the user of any of the control vocabulary and the messages stored in the scratchpad.

5. A system according to claim 1 wherein said speech recognizing means is of the isolated word monospeaker type.

6. A system according to claim 1, wherein said synthesis means is of the linear prediction type.

7. A system according to claim 1, wherein said recording means comprises a delta modulation-demodulation circuit.

8. A system according to claim 1, wherein said means for recording and playback comprises an amplifier-speaker unit of a car radio for playback of said stored messages.

* * * * *